Patented Jan. 22, 1952

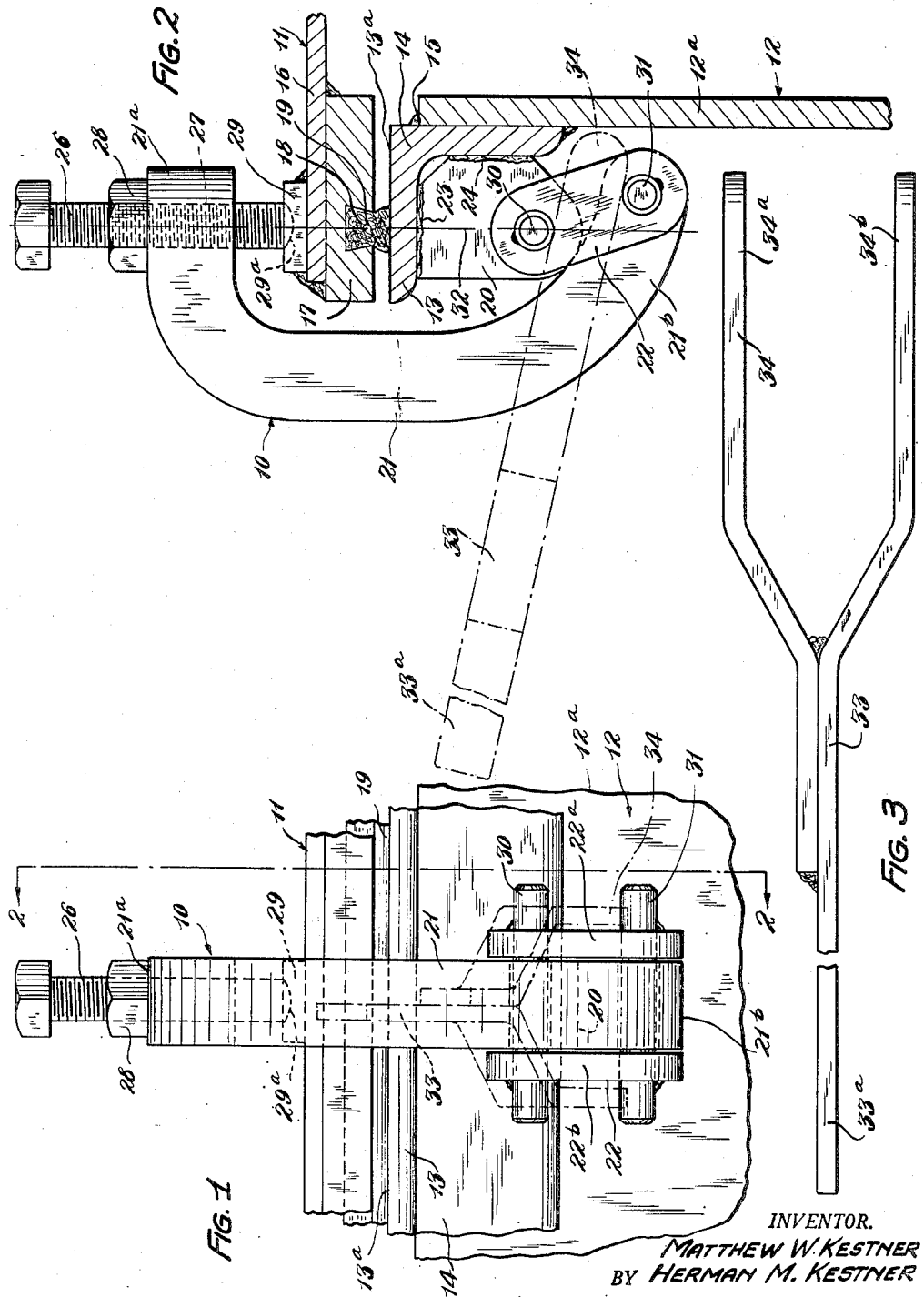

2,583,053

UNITED STATES PATENT OFFICE 2,583,053

QUICK ACTION HATCH CLAMP

Matthew W. Kestner and Herman M. Kestner, Cleveland, Ohio, assignors to The American Ship Building Company, Cleveland, Ohio, a corporation of New Jersey Application December 18, 1947, Serial No. 792,552

1 Claim. (Cl. 292—256.5)

This invention relates to clamping devices for hatch covers and more particularly to quick action hatch clamps.

When cargo ships enter or leave a port where cargo is loaded or unloaded, it is necessary to remove and replace the hatch covers. In the case of bulk cargo vessels having a large number of hatches, this consumes much time and involves considerable work, particularly where the hatch covers are held in their closed position by clamps employing a screw means which must be actuated to apply or release the clamp, such as have been commonly used heretofore. So-called "quick action" hatch clamps have been proposed heretofore, but so far as we are aware all of them have been of such a complex form as to render them expensive and impractical.

As its principal object, the present invention provides an improved quick action hatch clamp which comprises only a minimum number of parts and, hence, can be economically manufactured and installed and which can be quickly and easily applied and released without requiring the actuation of a screw means.

Another object of this invention is to provide an improved quick action hatch clamp in which novel toggle means is employed for actuating the clamp to its engaged and released positions and for releasably locking the clamp in the engaged position.

A further object is to provide a quick action clamp for use with a hatch cover and a laterally projecting cover seat, in which a clamp member is connected with such laterally projecting seat and is actuated to its engaged or released position by toggle means located beneath said laterally projecting seat.

Still another object is to provide improved quick action clamping mechanism of the character mentioned, in which a detachable actuating lever is adapted to be applied to the toggle means and facilitates the actuation of the mechanism to its engaged and released positions.

The invention further provides an improved hatch clamp of the quick action toggle type in which adjustable screw means forms the cover-engaging portion of the clamp.

The invention can be further briefly summarized as consisting in certain novel combinations and arrangements of parts hereinafter described and particularly set out in the claims hereof.

In the accompanying sheet of drawings,

Fig. 1 is a front elevational view showing a quick action hatch clamp embodying the present invention;

Fig. 2 is a vertical sectional view taken through the hatch coaming and cover, as indicated by line 2—2 of Fig. 1, the hatch clamp being shown in side elevation; and Fig. 3 is a plan view showing a detachable lever or tool for actuating the hatch clamp.

In the embodiment of the invention illustrated in the drawing, the improved hatch clamp 10 is shown in conjunction with a hatch cover 11 and a coaming 12 which extends around the hatch opening. The coaming 12 may comprise an upright metal plate 12a and a laterally outwardly extending flange 13 adjacent the upper edge of the plate and forming a cover seat 13a on which the cover 11 is adapted to be supported. The flange 13 can be formed by one leg of a metal bar, such as the angle iron 14 shown in this instance and which is attached to the plate 12a by the welding 15.

The cover 11 can be of any appropriate construction and may comprise one or more plate members 16 and stiffening bars or stringers 17 extending along the edge of the plate member and adapted to cooperate with the cover seat 13a of the coaming 12. If desired, the stringer 17 can be provided with a dovetail slot 18 in the underside thereof in which a suitable packing strip 19 is mounted for sealing engagement with the cover seat 13a.

The improved quick action clamp 10 comprises, in general, an anchor member 20, a clamp member 21 and a link 22 pivotally connecting the clamp member with the anchor member. The anchor member 20 can be a metal block, as here shown, having its top edge connected to the underside of the laterally extending leg of the angle iron 14 by means of the weld 23 and one of its vertical side edges connected to the vertical leg of the angle iron by means of the weld 24. When the anchor member 20 is mounted in this position it will be observed that it lies directly beneath the cover seat 13a of the coaming 12.

The clamp member 21 comprises a substantially C-shaped metal member having an upper arm portion 21a adapted to extend in overhanging relation to the edge portion of the cover 11 and the cover seat 13a, as shown in Fig. 2, and a lower arm portion 21b which extends downwardly and laterally beneath the cover seat 13a at a point below the anchor member 20. The upper arm portion 21a can be constructed of a shape suitable for direct engagement with the top of the hatch cover 11, but preferably, and as here shown, is provided with an adjustable pressure element 26 for engagement with the hatch cover.

The pressure element 26 may be in the form of a screw which extends through a threaded opening 27 of the arm portion 21a and a lock nut 28 mounted on the screw and engageable with the arm portion for locking the screw in a desired position of adjustment. The lower end of the screw engages the hatch cover 11 for applying the clamping pressure thereto and for this purpose the hatch cover is preferably provided with a pressure element 29 in the form of a block or strip having a recess or depression 29a therein in which the lower end of the screw engages, as shown in Fig. 2.

The link 22 which connects the lower arm 21b of the clamp member 21 with the anchor member 20 may be of the open type as here shown, comprising a pair of laterally spaced side plates or link members 22a and 22b and a pair of pivot pins 30 and 31. The link members 22a and 22b have their upper ends disposed on opposite sides of the anchor member 20 and pivotally connected with the latter by means of the pivot pin 30 which extends through the anchor member and is of a length such that its ends project beyond the link members. Similarly, the lower ends of the link members 22a and 22b are disposed on opposite sides of the lower arm portion 21b of the clamp member 21 and are pivotally connected therewith by means of the pivot pin 31, the latter also being of a length such that its ends project beyond the link members.

In the construction of the improved clamp 10, as thus far described, it will be observed that when the clamp member 21 is in its cover-engaging position as shown in Fig. 2, the pressure elements 26 and 29, as well as the packing 19 and the axis of the pivot pin 30, all lie on the same vertical axis 32 which extends substantially normal to the plane of the cover seat 13a of the coaming 12. This relative arrangement enables the link 22 to cooperate with the anchor member 20 and clamp member 21 in forming a toggle, and this constitutes an important feature of the present invention.

When the clamp member 21 is applied to the hatch cover 11 so as to engage the pressure element 26 with the pressure element 29 and the lower end of the clamp member 21 is then moved toward the coaming 12 so as to cause the pivot pin 31 to be shifted to a position on the right-hand side of the vertical axis 32, as shown in Fig. 2, the toggle link 22 will exert a downward pull on the clamp member causing the hatch cover 11 to be pressed against the seat 11a. Because of the toggle action thus produced by the link 22, the movement of the pivot pin 31 to the right-hand side of the vetrical axis 32 will cause the clamp member 21 to assume a locked condition in which the pressure being applied to the hatch cover 11 will be constantly maintained.

When the lower end of the clamp member 21 is moved away from the coaming 12 so as to shift the pivot pin 31 to the left-hand side of the vertical axis 32, the link 22 will first release the locked condition of the clamp and will then exert an upward thrust on the clamp member to relieve the pressure of the element 26 against the element 29 of the cover. The clamp member 21 will then be in its released condition and can be swung outwardly and downwardly to a position which will not interfere with the removal of the hatch cover from the coaming 12.

To facilitate the swinging of the pivot pin 31 from one side to the other of the vertical axis 32 for locking or releasing the clamp member 21, an actuating lever 33 can be provided. As shown in Fig. 3, this lever is provided at one end with a handle portion 33a and at the other end with a forked portion 34 formed by a pair of spaced fork arms 34a and 34b. In using the lever 33, the forked end 34 thereof is applied to the link 22 in straddling relation, as illustrated in the broken lines shown in Figs. 1 and 2. When the lever is applied in this position the fork arms 34a and 34b extend between the laterally projecting paired ends of the pivot pins 30 and 31, as shown in the drawing.

Assuming that the actuating lever 33 has been applied to the clamp 130 in this manner and while the clamp is in its engaged and locked position as shown in Fig. 2, an upward swinging of the lever will apply torque to the link 22 and cause swinging of the latter in a direction away from the coaming 12 for releasing the clamp, as explained above. When the forked end of the lever 33 is applied to the link 22 while the clamp is in its released and unlocked condition and the lever is then moved in a downward direction to substantially the position shown in Fig. 2, the link will be swung toward the coaming 12 and will actuate the clamp member 21 to its engaged and locked position, as explained above.

It will be understood, of course, that a number of the hatch clamps 10 would ordinarily be provided on the coaming 12 and spaced at appropriate distances therealong. It will also be understood that a deck hand carrying the actuating lever 33 can walk alongside the coaming and apply the lever in succession to the clamping devices, and thus quickly actuate the clamp members to their engaged or disengaged positions.

From the foregoing description and the accompanying drawing it will now be readily understood that this invention provides an improved quick action hatch clamp which embodies only a minimum number of parts and can be economically manufactured and installed, and which can be quickly and easily actuated for clamping or releasing a hatch cover. It will be seen, furthermore, that the improved clamping device embodies elements which cooperate to form a toggle and that this toggle provides a means for moving the clamp member to its engaged and released position and for releasably locking the clamp member in the engaged position.

Although the improved quick action hatch clamp has been illustrated and described herein to a somewhat detailed extent, it will be understood, of course, that the invention is not to be regarded as limited correspondingly in scope, but includes all changes and modifications coming within the terms of the claim hereof.

Having thus described our invention, we claim:

A clamping device for releasably securing a hatch cover against a laterally projecting cover seat of a coaming, comprising an anchor member adapted to be rigidly connected with said coaming beneath said seat, a link having upper and lower ends, a first pivot pin pivotally connecting the upper end of said link with said anchor member, a rigid clamp member having upper and lower arms adapted to extend in transverse crossing relation to said seat and an edge portion of said cover, a second pivot pin pivotally connecting the lower arm of said clamp member with the lower end of said link such that said link cooperates with said anchor member and lower arm in forming a toggle, a pair of pressure elements having convex and concave bearing portions adapted for interfitting engagement, one of said pressure elements being an adjustable screw extending through said upper arm toward said lower arm and the other pressure element being adapted for mounting in fixed relation on said cover, said screw and other pressure element lying substantially on a vertical axis passing through the pivot axis of said first pivot pin when said clamp member is in its cover-engaging position and said convex and concave bearing portions forming a localized fulcrum point on said vertical axis and about which said clamp member is adapted to rock during swinging of the said second pivot pin from one side to the other of said vertical axis for actuating said toggle in applying or releasing clamping pressure on said cover, and tool receiving means for facilitating actuation of said toggle comprising pairs of projections extending laterally from opposite sides of the device and each pair of said projections defining therebetween a recess for receiving a tool portion, said first and second pivot pins being of a greater length than the thickness of said link in the direction of the pivot pin axis such that the ends of said pivot pins form said pairs of projections.

MATTHEW W. KESTNER.
HERMAN M. KESTNER.

REFERENCES CITED

The following references are of record in the file of this patent:

UNITED STATES PATENTS

| Number | Name | Date |
| --- | --- | --- |
| 987,906 | Montross | Mar. 28, 1911 |
| 1,019,226 | Craigie | Mar. 5, 1912 |
| 2,121,386 | Hendrickson | June 21, 1938 |
| 2,355,890 | Parks | Aug. 15, 1944 |
| 2,485,645 | Norquist | Oct. 25, 1949 |

FOREIGN PATENTS

| Number | Country | Date |
| --- | --- | --- |
| 393,706 | Great Britain | June 15 1933 |